US010635445B2

(12) United States Patent
Teyssier et al.

(10) Patent No.: US 10,635,445 B2
(45) Date of Patent: Apr. 28, 2020

(54) HANDLING MODIFICATIONS TO PERMITTED PROGRAM COUNTER RANGES IN A DATA PROCESSING APPARATUS

(71) Applicant: Arm Limited, Cambridge (GB)

(72) Inventors: Rémi Marius Teyssier, Le Bar sur Loup (FR); Albin Pierrick Tonnerre, Nice (FR); Cédric Denis Robert Airaud, Saint Laurent du Var (FR); Luca Nassi, Antibes (FR); Guillaume Bolbenes, Antibes (FR); Francois Donati, Antibes (FR); Lee Evan Eisen, Round Rock, TX (US); Pasquale Ranone, Antibes (FR)

(73) Assignee: Arm Limited, Cambridge (GB)

( * ) Notice: Subject to any disclaimer, the term of this patent is extended or adjusted under 35 U.S.C. 154(b) by 151 days.

(21) Appl. No.: 15/991,220

(22) Filed: May 29, 2018

(65) Prior Publication Data

US 2019/0370001 A1    Dec. 5, 2019

(51) Int. Cl.
*G06F 9/38*     (2018.01)
*G06F 9/46*     (2006.01)
*G06F 9/32*     (2018.01)

(52) U.S. Cl.
CPC .......... *G06F 9/3844* (2013.01); *G06F 9/324* (2013.01); *G06F 9/3806* (2013.01); *G06F 9/3861* (2013.01); *G06F 9/468* (2013.01)

(58) Field of Classification Search
CPC ...... G06F 9/3844; G06F 9/3806; G06F 9/324; G06F 9/468; G06F 9/3861;
(Continued)

(56) References Cited

U.S. PATENT DOCUMENTS

2016/0300060 A1* 10/2016 Pike .................... G06F 11/3604
2017/0097898 A1*  4/2017 Durham ............... G06F 9/3005

FOREIGN PATENT DOCUMENTS

GB      2540206 A  *  1/2017  ............. G06F 12/06
GB      2541714 A  *  3/2017  ......... G06F 9/30181

OTHER PUBLICATIONS

Watson, RNM et al. Capability Hardware Enhanced RISC Instructions: CHERI Instruction-set architecture. U of Cambridge Technical Report, pp. 1-131, Apr. 2014, [online], [retrieved on Dec. 6, 2019]. Retrieved from the Internet <URL: https://www.cl.carmac.uk/techreports/UCAM-CL-TR-850.pdf>.*

* cited by examiner

*Primary Examiner* — Aimee Li
*Assistant Examiner* — Shawn Doman
(74) *Attorney, Agent, or Firm* — Nixon & Vanderhye P.C.

(57) ABSTRACT

An apparatus and method of operating an apparatus are disclosed. The apparatus has a program counter permitted range storage element defining a permitted range of program counter values for the sequence of instructions it executes. Branch prediction circuitry predicts target instruction addresses for branch instructions. In response to a program counter modifying event, a program counter speculative range storage element is updated corresponding to each speculatively executed instruction after a branch instruction. Program counter permitted range verification circuitry is responsive to resolution of a modification of the program counter permitted range indication resulting from the program counter modifying event to determine whether the speculatively executed program counter range satisfies the permitted range of program counter values. A branch mis- (Continued)

prediction mechanism may support the response of the apparatus if the permitted range of program counter values is violated.

15 Claims, 6 Drawing Sheets

(58) Field of Classification Search
CPC ...... G06F 12/1441; G06F 9/34; G06F 9/3004; G06F 9/3857; G06F 9/3859
USPC .................................................. 712/34, 234
See application file for complete search history.

HANDLING MODIFICATIONS TO PERMITTED PROGRAM COUNTER RANGES IN A DATA PROCESSING APPARATUS

TECHNICAL FIELD

The present disclosure relates to data processing. In particular, the present disclosure relates to data processing architectures which define a permitted program counter range.

DESCRIPTION

Some data processing architectures support bounded pointers. For a bounded pointer, the pointer value may identify, or be used to determine, the address of a data value to be accessed or an instruction to be executed, for example. The pointer value may also have an associated range information which indicates an allowable range of addresses when using the pointer value. This can be useful to ensure that the address determined from the pointer remains within certain bounds to maintain security or functional correctness of behaviour. In addition, certain permission/restriction information may be specified in association with the pointer value of a bounded pointer. The range information and any permission/restriction information for a bounded pointer may be referred to as capability information, and within a capability-enabled architecture such a bounded pointer (including its associated capability information) may be referred to as a capability. One particular use of a capability is an association with program counter values and a capability-enabled architecture can provide a program counter capability (PCC) register for which can defined an authorised range for an executed instruction's program counter (PC) value. Furthermore, in such an architecture some instructions may be able to modify the content of the PCC register and hence change the range of authorised PC values. Consequently, for example following a branch, the processor must check the PC value of instructions following the branch are in the authorised capability range defined. On the one hand branch resolution can be slow and therefore an approach may be taken in which a processor speculatively executes instructions following a branch based on a predicted branch outcome (branch prediction and branch target prediction). Generally this prediction can be relatively accurate and only in the relatively rare cases when the prediction is wrong is a mis-prediction generated to refetch the branch and the correct sequence of instructions for execution. This predictive approach could also be taken to the modification of PCC content, yet it would typically require expensive modification to the configuration of an instruction fetch unit in the apparatus to provide the required predictive functionality.

SUMMARY

In one example embodiment described herein there is an apparatus comprising: instruction execution circuitry to execute a sequence of instructions, each instruction identified by a program counter value indicative of an address of the instruction; a program counter permitted range storage element to store a program counter permitted range indication, wherein the program counter permitted range indication defines a permitted range of program counter values for the sequence of instructions; and fetch circuitry to retrieve the sequence of instructions from addresses in memory, wherein the fetch circuitry comprises: branch prediction circuitry to predict target instruction addresses for branch instructions; and a program counter speculative range storage element to store a speculatively executed program counter range, wherein the fetch circuitry is responsive to a program counter modifying event: to retrieve instructions from a predicted target instruction address for the program counter modifying event and subsequent addresses for speculative execution by the instruction execution circuitry; and to update the speculatively executed program counter range to include each speculatively executed instruction, and wherein the apparatus further comprises program counter permitted range verification circuitry responsive to resolution of a modification of the program counter permitted range indication resulting from the program counter modifying event to determine whether the speculatively executed program counter range satisfies the permitted range of program counter values.

In one example embodiment described herein there is a method of data processing comprising: fetching a sequence of instructions from addresses in memory; storing a program counter permitted range indication, wherein the program counter permitted range indication defines a permitted range of program counter values for the sequence of instructions; and executing the sequence of instructions, each instruction identified by a program counter value indicative of an address of the instruction, wherein the fetching comprises: predicting a target instruction addresses for branch instructions; storing a speculatively executed program counter range, and in response to a program counter modifying event: retrieving instructions from a predicted target instruction address and subsequent addresses for speculative execution by the instruction execution circuitry; and updating the speculatively executed program counter range to include each speculatively executed instruction; and in response to resolution of a modification of the program counter permitted range indication resulting from the program counter modifying event, determining whether the speculatively executed program counter range satisfies the permitted range of program counter values.

In one example embodiment described herein there is an apparatus comprising: means for fetching a sequence of instructions from addresses in memory; means for storing a program counter permitted range indication, wherein the program counter permitted range indication defines a permitted range of program counter values for the sequence of instructions; means for executing the sequence of instructions, each instruction identified by a program counter value indicative of an address of the instruction, wherein the means for fetching comprises: means for predicting a target instruction addresses for branch instructions; and means for storing a speculatively executed program counter range, and the means for fetching further comprises, responsive to a program counter modifying event: means for retrieving instructions from a predicted target instruction address and subsequent addresses for speculative execution by the means for executing the sequence of instructions; and means for updating the speculatively executed program counter range to include each speculatively executed instruction; and responsive to resolution of a modification of the program counter permitted range indication resulting from the program counter modifying event, means for determining whether the speculatively executed program counter range satisfies the permitted range of program counter values.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided an apparatus comprising: instruction execution circuitry to execute a sequence of instructions, each instruction identified by a program counter value indicative of an address of the instruction; a program counter permitted range storage element to store a program counter permitted range indication, wherein the program counter permitted range indication defines a permitted range of program counter values for the sequence of instructions; and fetch circuitry to retrieve the sequence of instructions from addresses in memory, wherein the fetch circuitry comprises: branch prediction circuitry to predict target instruction addresses for branch instructions; and a program counter speculative range storage element to store a speculatively executed program counter range, wherein the fetch circuitry is responsive to a program counter modifying event: to retrieve instructions from a predicted target instruction address for the program counter modifying event and subsequent addresses for speculative execution by the instruction execution circuitry; and to update the speculatively executed program counter range to include each speculatively executed instruction, and wherein the apparatus further comprises program counter permitted range verification circuitry responsive to resolution of a modification of the program counter permitted range indication resulting from the program counter modifying event to determine whether the speculatively executed program counter range satisfies the permitted range of program counter values.

In order to make good forward progress with the sequence of instructions which it executes the apparatus comprises branch prediction circuitry to predict target instruction addresses for branch instructions (based on previous behaviour), such that the instruction execution circuitry does not need to stall at each branch and wait for its resolution before being able to proceed. In other words the instruction execution circuitry performs speculative instruction execution. However, the present techniques recognise that to provide such prediction resources (in the manner that branch prediction resources are provided for branch instructions) for program counter permitted ranges when the program counter permitted range is modified would be undesirably costly in terms of the additional hardware needed to be provided within the fetch circuitry. Instead the present techniques propose a different approach according to which a storage element is provided to maintain a speculatively executed program counter range when a program counter modifying event occurs. Accordingly, when a program counter modifying event (such as a branch instruction) is encountered, the speculatively executed program counter range is updated for each speculatively executed instruction, so that this set of program counter values can be kept track of A modification of the program counter permitted range indication stored in the program counter permitted range storage element, which results from the program counter modifying event, can take a non-negligible amount of time to resolve in such an apparatus, during which time a number of instructions may be speculatively executed each with a further program counter value. The present techniques allow the program counter value of the speculatively executed instructions to be tracked such that once the modification of the program counter permitted range indication is resolved a comparison can be made between the speculatively executed program counter range and the program counter permitted range indication. The corresponding set of instructions can then for example be committed or flushed depending on the outcome of this comparison. Accordingly, the non-negligible time required to resolve the modification to the program counter permitted range indication need not delay forward progress of the execution of the sequence of instructions, yet without requiring prediction capability to be provided with respect to program counter permitted range indications.

The apparatus may respond in a variety of ways to the outcome of the comparison between the resolved program counter permitted range indication and the speculatively executed program counter range, depending on the particular system requirements, but in some embodiments the fetch circuitry is responsive to a determination by the program counter permitted range verification circuitry that the speculatively executed program counter range does not satisfy the permitted range of program counter values to trigger a branch mis-prediction response modified to re-fetch instructions from the predicted target instruction address. The present techniques recognise that although program counter prediction circuitry is not provided in an analogous matter to the branch prediction circuitry, nevertheless given that the speculatively executed program counter range relates to speculatively allowing execution of instructions following a program counter modifying event which has modified the program counter permitted range indication, a branch mis-prediction response already existing in the apparatus to support speculative program execution on the basis of branch prediction can be made use of when it is found that the speculatively executed program counter range does not satisfy the permitted range of program counter values. In other words, just as when a mis-predicted branch can trigger the branch mis-prediction response, the same branch mis-prediction response mechanisms may be made use of in the present techniques relating to program counter modification and subsequent speculative instruction execution.

Nevertheless when such a branch mis-prediction response is triggered and a set of instructions are re-fetched accordingly, this may not simply be a replay of those instructions and in some embodiments the branch mis-prediction response comprises performing a re-fetch procedure, in which the fetch circuitry fetches instructions from the predicted target instruction address and subsequent addresses for execution by the instruction execution circuitry, and the re-fetch procedure further comprises the fetch circuitry determining individually for each instruction of the instructions from the predicted target instruction address and subsequent addresses whether each instruction satisfies the permitted range of program counter values defined by the program counter permitted range indication stored in the program counter permitted range storage element. Thus, following the re-fetch procedure at this iteration the fetch circuitry can individually determine for each instruction whether the program counter permitted range indication is satisfied for that instruction. This allows a determination to be made of which individual instruction following the program counter modifying event caused the violation of the permitted range of program counter values, since at the original iteration it is only known that it was at least one instruction within the block which built up the speculatively executed program counter range. On the basis of the identified instruction which caused violation of the permitted range of program counter values suitable diagnostic, remedial, or defensive action can be taken.

Conversely once the modification of the program counter permitted range indication is resolved and when it is determined that none of the speculatively executed instructions violated the permitted program counter range these instructions need no longer be viewed as speculatively executed (at least with respect to the permitted program counter range) and accordingly in some embodiments the fetch circuitry is responsive to a determination by the program counter permitted range verification circuitry that the speculatively executed program counter range does satisfy the permitted range of program counter values to trigger a commit response with respect to the speculatively executed instructions in the speculatively executed program counter range.

The program counter speculative range storage element may be variously configured, but in some embodiments the program counter speculative range storage element is arranged to store a speculatively executed lowest program counter value and a speculatively executed highest program counter value to represent the speculatively executed program counter range. Maintaining a lowest and highest program counter value in this manner represents an efficient mechanism for monitoring the speculatively executed program counter range.

Further, in some such embodiments the fetch circuitry is responsive to the program counter modifying event to initialise the speculatively executed lowest program counter value with the predicted target instruction address. The speculatively executed program counter range can then be monitored (in its typically upwardly progressing manner) with reference to the predicted target instruction address.

Thus, one manner of efficiently updating the speculatively executed program counter range is to modify the highest program counter value encountered and accordingly in some embodiments updating the speculatively executed program counter range to include each speculatively executed instruction comprises updating the speculatively executed highest program counter value with a program counter value for each speculatively executed instruction.

The present techniques further encompass situations in which further program counter modifying events may take place before previous program counter modifying events are resolved and to support this the program counter speculative range storage element can be configured to maintain ranges corresponding to multiple program counter modifying events. Accordingly in some embodiments the program counter speculative range storage element is arranged to store speculatively executed program counter ranges for each unresolved program counter modifying event encountered by the fetch circuitry, and the fetch circuitry is responsive to the program counter modifying event to determine an index to select between multiple entries in the program counter speculative range storage element.

The permitted range of program counter values may not only define program counter values per se which may be accessed but may further define other conditions or restrictions on the use of those program counter values. For example in the context of the above-mentioned capabilities, additional rules may be defined for types of instructions which may access certain program counter values and so on. Thus in some embodiments the program counter permitted range storage element is arranged further to store restriction information defining one or more restrictions on use of the permitted range of program counter values, wherein the program counter permitted range verification circuitry is further responsive to resolution of the program counter modifying event to determine whether the one or more restrictions are satisfied.

The program counter modifying event may in principle may be any event within the apparatus which causes a modification to the program counter permitted range indication, but in embodiments the program counter modifying event may be reception of a branch instruction by the fetch circuitry, reception of a return instruction by the fetch circuitry, an exception entry, and an exception return.

In accordance with one example configuration there is provided a method of data processing comprising fetching a sequence of instructions from addresses in memory; storing a program counter permitted range indication, wherein the program counter permitted range indication defines a permitted range of program counter values for the sequence of instructions; and executing the sequence of instructions, each instruction identified by a program counter value indicative of an address of the instruction, wherein the fetching comprises: predicting a target instruction addresses for branch instructions; storing a speculatively executed program counter range, and in response to a program counter modifying event: retrieving instructions from a predicted target instruction address and subsequent addresses for speculative execution by the instruction execution circuitry; and updating the speculatively executed program counter range to include each speculatively executed instruction; and in response to resolution of a modification of the program counter permitted range indication resulting from the program counter modifying event, determining whether the speculatively executed program counter range satisfies the permitted range of program counter values.

In accordance with one example configuration there is provided an apparatus comprising means for fetching a sequence of instructions from addresses in memory; means for storing a program counter permitted range indication, wherein the program counter permitted range indication defines a permitted range of program counter values for the sequence of instructions; means for executing the sequence of instructions, each instruction identified by a program counter value indicative of an address of the instruction, wherein the means for fetching comprises: means for predicting a target instruction addresses for branch instructions; and means for storing a speculatively executed program counter range, and the means for fetching further comprises, responsive to a program counter modifying event: means for retrieving instructions from a predicted target instruction address and subsequent addresses for speculative execution by the means for executing the sequence of instructions; and means for updating the speculatively executed program counter range to include each speculatively executed instruction; and responsive to resolution of a modification of the program counter permitted range indication resulting from the program counter modifying event, means for determining whether the speculatively executed program counter range satisfies the permitted range of program counter values.

Particular embodiments will now be described with reference to the figures.

Figure 1:
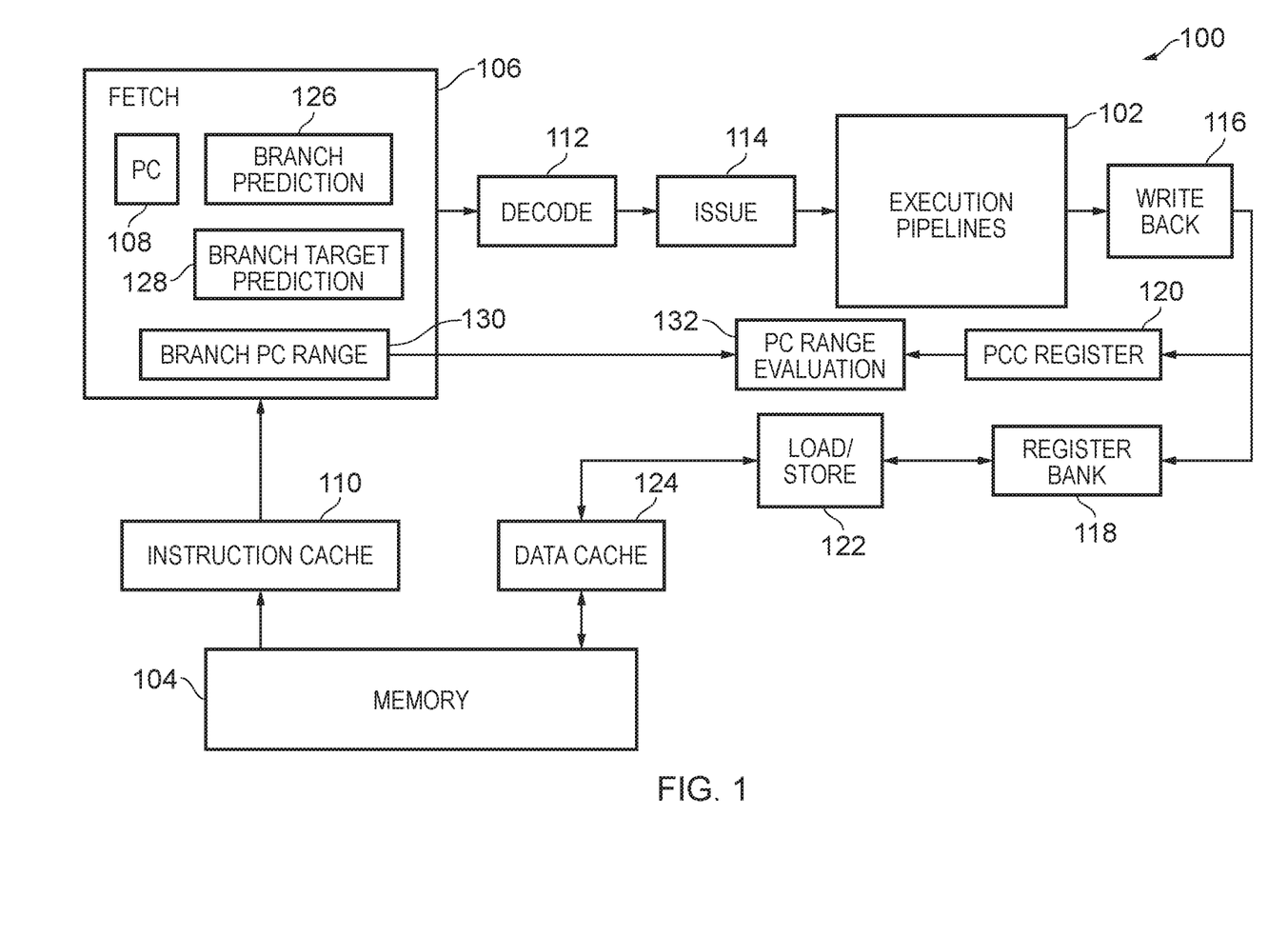
FIG. 1 schematically illustrates an apparatus in one embodiment.

FIG. 1 illustrates a data processing apparatus 100 in accordance with one embodiment. The data processing apparatus 100 comprises execution pipelines 102, which are arranged to perform data processing operations in response to a sequence of instructions received. These instructions are stored in the memory 104 and from where they are caused to be retrieved by fetch circuitry 106. In general, the fetch circuitry 106 retrieves sequential instructions from the memory 104, that is to say instructions which follow sequentially in program counter order. The fetch circuitry 106 maintains a program counter value 108 for this purpose. The data processing apparatus 100 further comprises an instruction cache 110 to store temporary copies of instructions retrieved from the memory 104 and in particular to avoid the latency associated with the retrieval of an instruction from the memory 104. The illustration of FIG. 1 is necessarily at a high level of abstraction for the purpose of clarity and one of an ordinary skill in the art will appreciate that many components and interconnections of such a data processing apparatus have not been explicitly illustrated. To take just one example, the data processing apparatus 100 may comprise mechanisms for prefetching instructions from memory 104 in order to pre-populate the instruction cache 110 with instructions before they are required. Instructions retrieved by the fetch circuitry 106 are passed to the decode circuitry 112 for decoding and from there to the issue circuitry (issue stage) 114, which issues instructions to the execution pipelines 102. Once a decoded instruction has been fully executed by the execution pipelines 102 a write back stage (circuitry) 116 is provided to update values, where appropriate, in register bank 118 of the apparatus. A particular register, namely the PCC register 120 is shown in FIG. 1 and further reference to this will be made below. A load/store circuitry unit 122 administers the storing of data values to and the retrieval of data values from the memory 104. A data cache 124 is provided to avoid the latency associated with accessing the memory 104 where possible.

Returning to fetch circuitry 106, FIG. 1 illustrates branch prediction circuitry 126 and branch target prediction circuitry 128, which are used to enable the fetch circuitry 106 to continue fetching instructions for execution despite the fact that these instructions comprise branch instructions which cause jumps in the value of the program counter value 108. For this purpose the fetch circuitry 106 comprises branch prediction circuitry 126 and branch target prediction circuitry 128. The branch prediction circuitry 126 is arranged to predict whether a given branch will be taken or not and the branch target prediction circuitry 128 is arranged to predict the target instruction address of a given branch instruction. These operate in a manner with which one of ordinary skill in the art will be familiar and for the purposes of brevity further description thereof is not given here. Additionally, the fetch circuitry 106 comprises branch PC range circuitry 130, which is arranged to keep a record of program counter values accessed following a branch. It will be recognised therefore that the data processing apparatus 100 is arranged to support speculative instruction execution, wherein the branch prediction circuitry 126 indicates whether a given branch instruction is expected to be taken or not and on the basis of that prediction the branch target prediction circuitry 128 provides a predicted branch target address from which the fetch circuitry 106 continues to fetch instructions from memory 104. When the branch is later resolved, i.e. it is known whether the branch was in fact taken or not, the speculatively executed instructions are either committed or squashed. The branch PC range circuitry 130 enables a record to be kept of the range of program counter values accessed following a branch instruction. FIG. 1 further illustrates PC range evaluation circuitry 132, which receives values from the branch PC range circuitry 130 and the PCC register 120. The PCC register 120 holds a program counter capability value, i.e. the value held not only indicates a given program counter value, but in addition indicates a permitted range of values (e.g. defined with respect to a base PC value). The program counter range evaluation circuitry 132 compares the range indicated by the PCC register 120 and the range of program counter values of the speculatively executed instructions indicated by the branch PC range circuitry 130 and determines if the permitted range has been respected or violated. If it is found that the range of program counter values accessed is within the permitted program counter range defined by the PCC value then the corresponding group of instructions can be committed. Conversely, if the permitted program counter range has been violated then the corresponding group of instructions are flushed (squashed), this being triggered by the mis-prediction mechanisms associated with the branch prediction functionality provided in the fetch circuitry 106.

Figure 2:
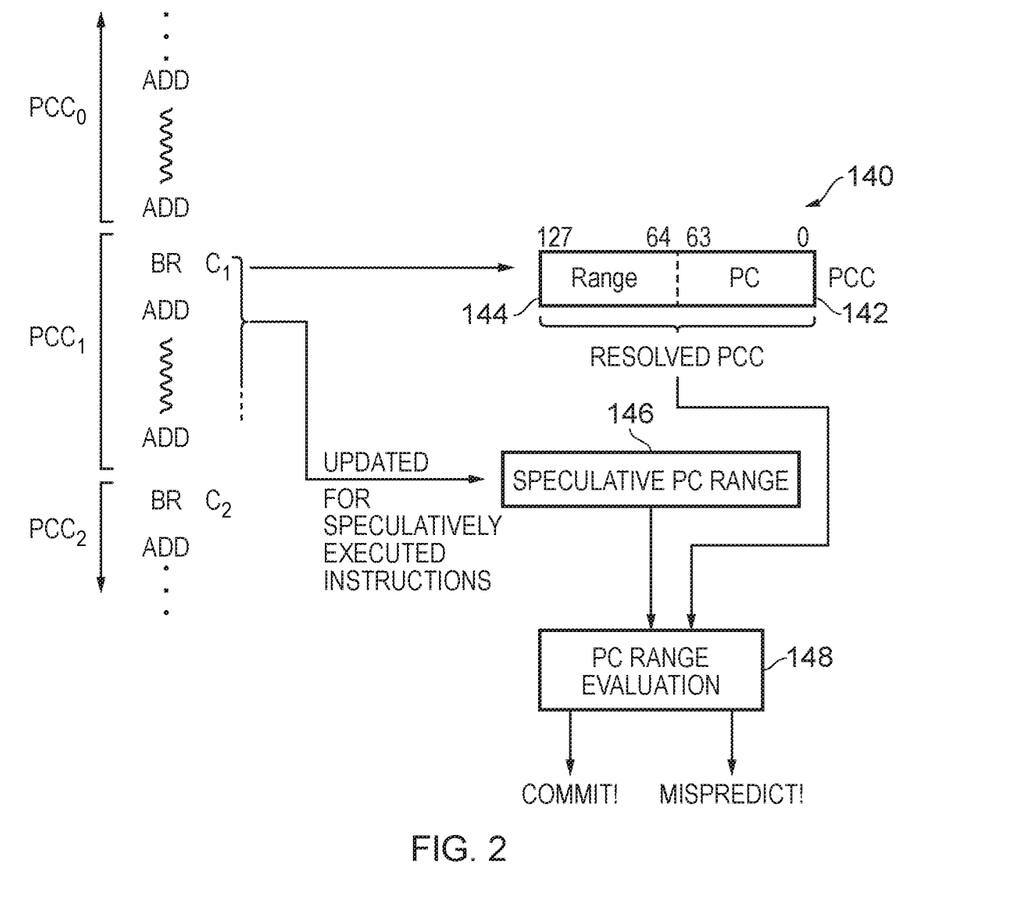
FIG. 2 schematically illustrates a sequence of executed program instructions, the updating of a speculative program counter range, and the evaluation of that speculative program counter range against a resolved allowed program counter range in one embodiment.

FIG. 2 gives an example of a sequence of instructions being executed and the manner in which the PCC value is updated and monitored together with the (speculative) program counter range. Following the sequence of instructions down the figure a first section of the sequence of instructions is shown for which the PCC value is given as $PCC_0$. The beginning of the next subsection of instructions (where the which the PCC value is given as $PCC_1$) is defined by the branch (BR) instruction which should be noted is a capability branch modifying the content of the PCC register. The branch prediction and branch target prediction mechanisms of the apparatus provide a prediction for the outcome of this branch instruction and therefore the sequence of instructions which are expected to be executed following it and the apparatus continues speculative execution down this path. In doing so a speculative program counter range 146 is updated for each instruction. Resolution of the modification of the content of the PCC register 140 is not instantaneous and a number of instructions are speculatively executed before this resolution occurs. Once resolved, the PC range evaluation circuitry 148 compares the resolved PCC with the speculative PC range 146 to determine if the latter respects the former. In other words, it is checked whether the program counter values of the speculatively executed instructions which follow the branch fall within the permitted range defined by the PCC value. If they do then these speculatively executed instructions can be committed, whereas if they do not then the mis-prediction mechanisms of the apparatus (also used for branch mis-prediction) are invoked in order to cause this group of speculatively executed instructions to be cancelled. Whilst the example illustrated is of a branch instruction modifying the PCC value, this could equally be other types of instruction which do this, such as a return instruction, or another type of event.

Figure 3:
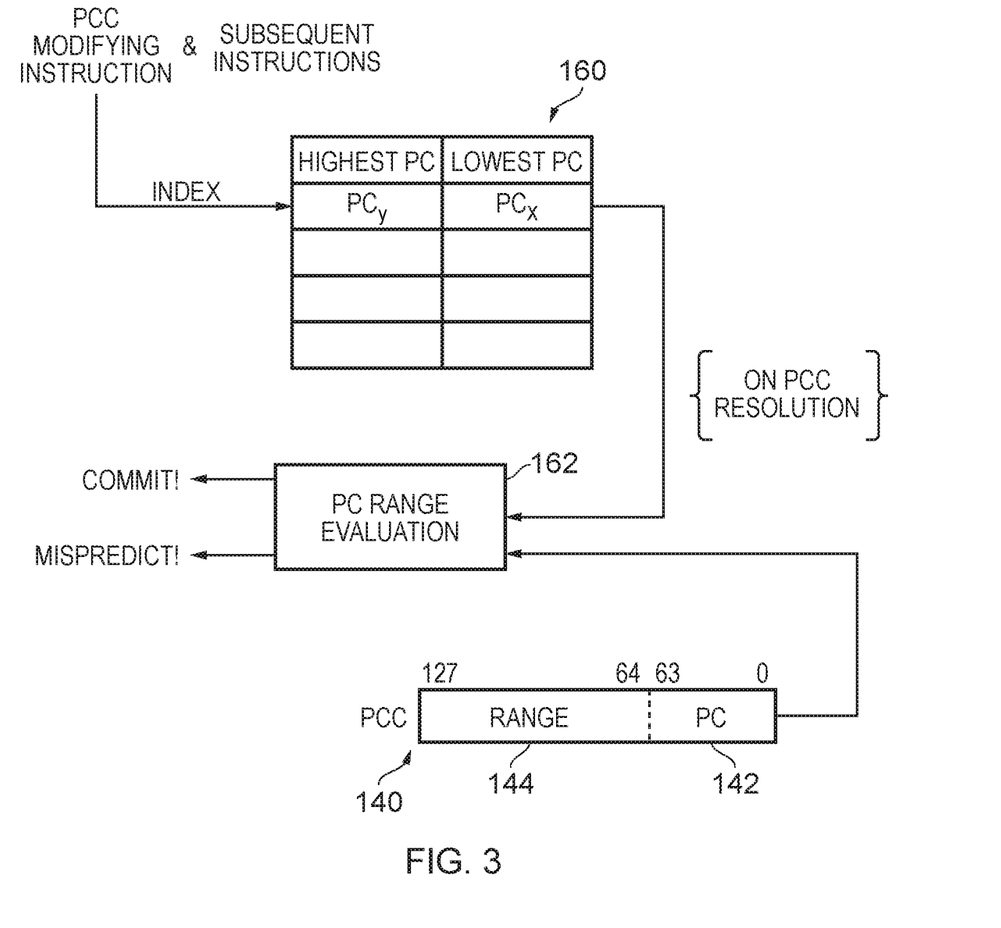
FIG. 3 schematically illustrates an example embodiment of a structure provided to maintain a speculative program counter range.

FIG. 3 schematically illustrates the configuration of a component 160 arranged to store a range of program counter values for speculatively executed instructions. This speculative program counter range component 160 is accessed for a program counter capability (PCC) modifying instruction (such as a capability branch) and the subsequent instructions which follow it and are speculatively executed before that branch is resolved. A given instruction causes an index into this storage structure to be generated (on the basis of the branch instruction address) identifying a particular pair of entries. As illustrated in the figure the pair of entries comprise a highest PC value and a lowest PC value. Updating the content of this entry for a given instruction comprises modifying one of these values such that the program counter range indicated by the pair of program counter values covers the set of speculatively executed instructions (including the original PCC modifying instruction). For a first instruction in the sequence (i.e. for the PCC modifying instruction) the lowest PC value is updated and thereafter the subsequent instructions cause either the lowest PC indication or the highest PC indication to be updated. Once the modification of the PCC register is resolved the PC range evaluation circuitry 162 compares the accessed range indicated with the permitted range defined by the PCC register 140 (in terms of its base PC value 142 and the range indicator 144). The corresponding group of speculatively executed instructions can then be permitted, or mis-prediction mechanisms can be triggered in order to cause this group to be squashed.

Figure 4:
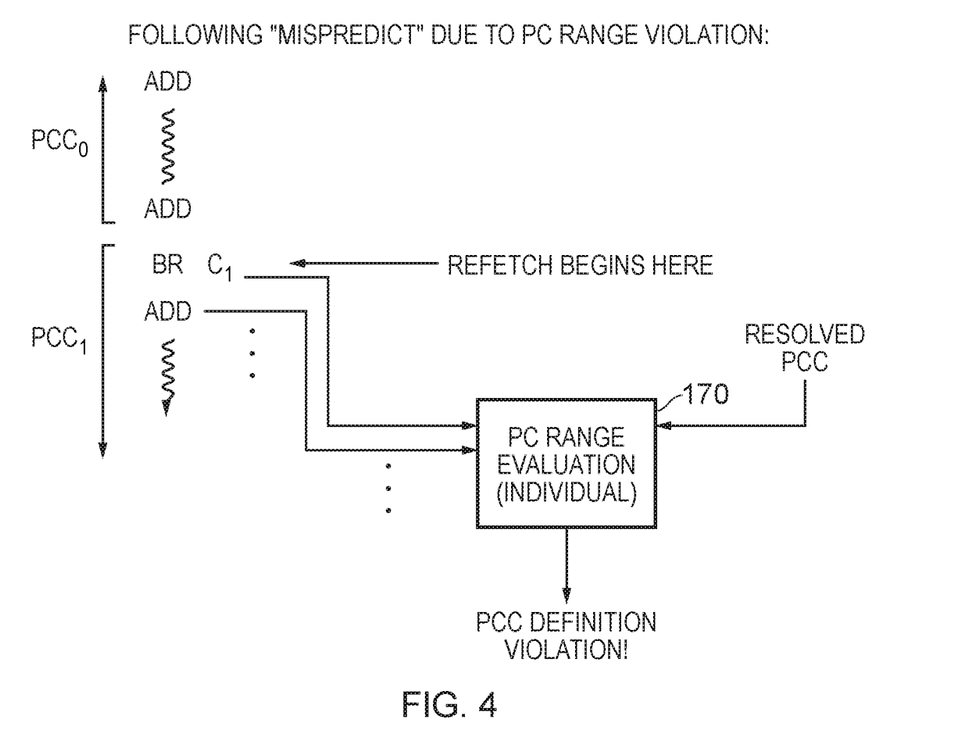
FIG. 4 schematically illustrates actions carried out following a mispredict in one embodiment.

FIG. 4 indicates a process which may take place following program counter range resolution when it is determined that the PC range accessed has violated the definition of the permitted PC range. The mis-prediction mechanism is then initiated and a re-fetch begins at the capability branch instruction. Note in particular however that what is triggered by this PC range violation is not a mis-predict as it would normally be handled by branch prediction mechanisms, since that would comprise fetching instructions defined by the alternative path following the branch instruction. Here a re-fetch is initiated which fetches the same sequence of instructions again, but at this iteration each individual instruction is compared against the (now resolved) PCC definition. It will be understood that where executing this sequence of instructions previously caused a violation of the permitted PC range this will naturally happen again. However at this iteration each individual instruction is evaluated against the PC range definition and this enables the individual instruction which caused that violation to be identified. Accordingly, for this purpose the PC range evaluation circuitry 170 compares each individual instruction following the branch against the resolved PCC range. One of those instructions then causes a violation of the PCC definition and this is signalled by the PC range valuation circuitry 170. Appropriate remedial or defensive steps may then be taken.

Figure 5:
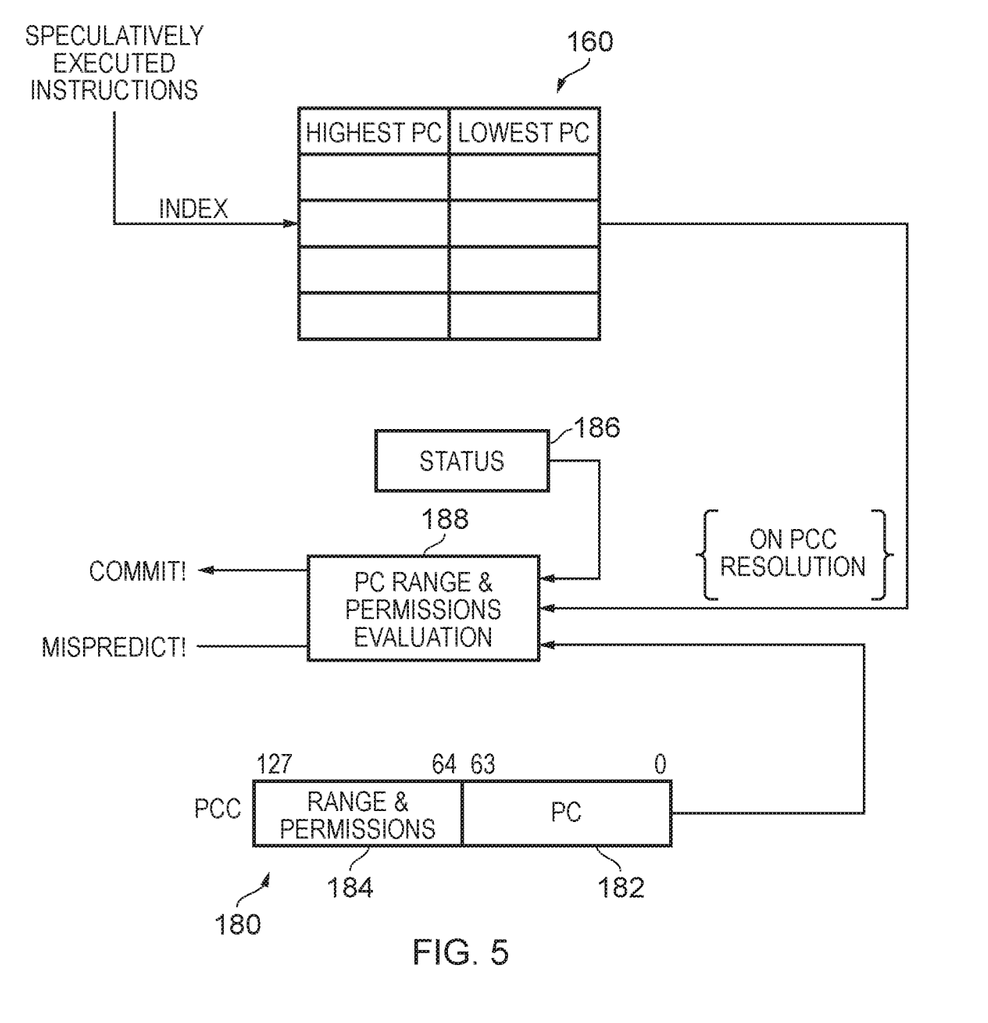
FIG. 5 schematically illustrates evaluation of a maintained speculative program counter range against a resolved program counter range and permissions in one embodiment.

FIG. 5 schematically illustrates a configuration which is a variant on that shown in FIG. 3. The speculatively executed program counter range 160 is the same as that shown in FIG. 160 and as described with respect to FIG. 3 speculatively executed instructions index into a pair of entries in this structure and cause one of the PC indicators (highest or lowest) to be modified to extend the defined range to cover this instruction. In the example of FIG. 5 however the PCC register 180 is configured to additionally define certain permissions associated with the range of program counter values. Thus, as well as a base PC value 182 additional information 184 is defined in the register to define the permitted range as well as those permissions. These are then evaluated by a modified version of the PC range evaluation circuitry 162 of FIG. 3, namely the PC range and permissions evaluation circuitry 188 of FIG. 5. This receives the value stored in the PCC register 180 as one input value together with a corresponding pair of entries from the range storage structure 160, and in addition receives additional status information relating to the status information 186 relating to the data processing apparatus. On the basis of a comparison of these the PC range and permissions evaluation circuitry 188 can determine not only if the range of PC values accessed falls legitimately within the PC range allowed, but also if the associated permissions have been respected. The additional status restrictions may for example relate to privilege level, read/write authorisation, execution context, and so on.

Figure 6:
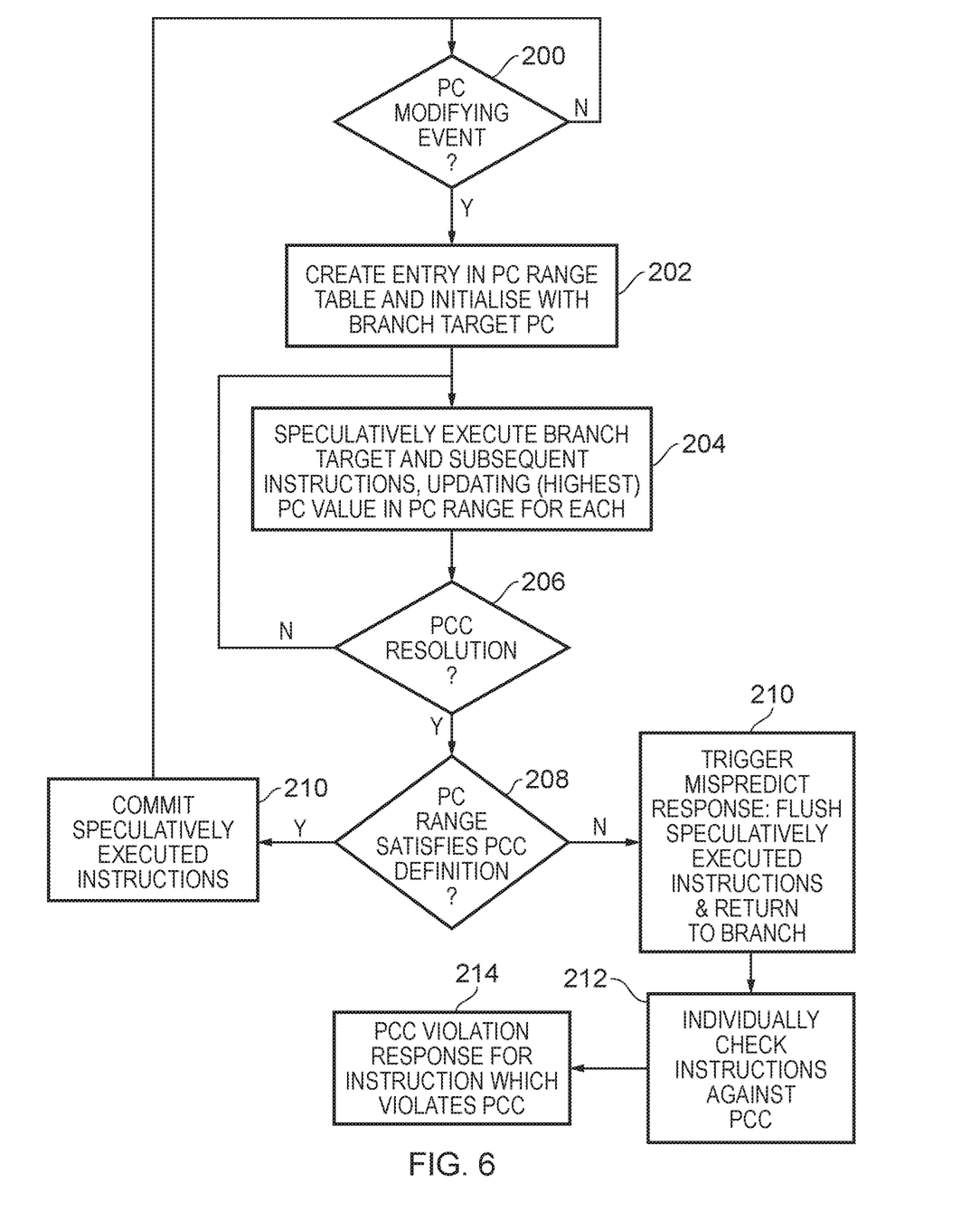
FIG. 6 is flow diagram showing a sequence of steps which are taken in the method of one example embodiment.

FIG. 6 is a flow diagram which shows a sequence of the steps which are taken by the method of one example embodiment. The flow can be considered to begin at step 200 where it is determined if a program counter modifying event has occurred and the flow loops on itself here whilst this is not true. When such an event does occur the flow proceeds to step 202, where an entry in a program counter range table is made corresponding to this event and the entry is initialised with an indication corresponding to a branch target address for this event. Then at step 204 speculative execution of the branch target instruction and subsequent instructions continues, with the program counter range table being updated for the program counter value of each, this typically comprising modifying the highest program counter value indicated as a sequence of incrementing instructions are speculatively executed. It is determined at step 206 if resolution of the modification of the content of the PCC register has been achieved and whilst it has not the flow loops on step 204 continuing the speculative execution of instructions and the updating of the PC range table. Once it is determined at step 206 that the modification of the PCC register has resolved then at step 208 it is determined if the range indicated in the PC range table satisfies the PCC definition. If it does then the flow proceeds to step 210 and the speculatively executed instructions are committed and the flow returns to step 200. However, if at step 208 it is determined that the PCC definition has been violated then at step 210 a mis-prediction response is triggered causing the speculatively executed instructions to be flushed and for execution to return to the PC modifying event, i.e. the branch. At step 212 instructions re-fetched from this branch are once more executed but now are individually checked against the PCC definition. Once the instruction which caused the violation of the PCC definition is identified then a PCC violation response is triggered at step 214.

In brief overall summary an apparatus and method of operating an apparatus are disclosed. The apparatus has a program counter permitted range storage element defining a permitted range of program counter values for the sequence of instructions it executes. Branch prediction circuitry predicts target instruction addresses for branch instructions. In response to a program counter modifying event, a program counter speculative range storage element is updated corresponding to each speculatively executed instruction after a branch instruction. Program counter permitted range verification circuitry is responsive to resolution of a modification of the program counter permitted range indication resulting from the program counter modifying event to determine whether the speculatively executed program counter range satisfies the permitted range of program counter values. A branch mis-prediction mechanism may support the response of the apparatus if the permitted range of program counter values is violated.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
   instruction execution circuitry to execute a sequence of instructions, each instruction identified by a program counter value indicative of an address of the instruction;
   a program counter permitted range storage element to store a program counter permitted range indication, wherein the program counter permitted range indication defines a permitted range of program counter values for the sequence of instructions; and
   fetch circuitry to retrieve the sequence of instructions from addresses in memory, wherein the fetch circuitry comprises:
      branch prediction circuitry to predict target instruction addresses for branch instructions; and
      a program counter speculative range storage element to store a speculatively executed program counter range,
   wherein the fetch circuitry is responsive to a program counter modifying event:
      to retrieve instructions from a predicted target instruction address for the program counter modifying event and subsequent addresses for speculative execution by the instruction execution circuitry; and
      to update the speculatively executed program counter range to include each speculatively executed instruction,
   and wherein the apparatus further comprises program counter permitted range verification circuitry responsive to resolution of a modification of the program counter permitted range indication resulting from the program counter modifying event to determine whether the speculatively executed program counter range satisfies the permitted range of program counter values.

2. The apparatus as claimed in claim 1, wherein the fetch circuitry is responsive to a determination by the program counter permitted range verification circuitry that the speculatively executed program counter range does not satisfy the permitted range of program counter values to trigger a branch misprediction response modified to re-fetch instructions from the predicted target instruction address.

3. The apparatus as claimed in claim 2, wherein the branch misprediction response comprises performing a re-fetch procedure, in which the fetch circuitry fetches instructions from the predicted target instruction address and subsequent addresses for execution by the instruction execution circuitry,
   and the re-fetch procedure further comprises the fetch circuitry determining individually for each instruction of the instructions from the predicted target instruction address and subsequent addresses whether each instruction satisfies the permitted range of program counter values defined by the program counter permitted range indication stored in the program counter permitted range storage element.

4. The apparatus as claimed in claim 1, wherein the fetch circuitry is responsive to a determination by the program counter permitted range verification circuitry that the speculatively executed program counter range does satisfy the permitted range of program counter values to trigger a commit response with respect to the speculatively executed instructions in the speculatively executed program counter range.

5. The apparatus as claimed in claim 1, wherein the program counter speculative range storage element is arranged to store a speculatively executed lowest program counter value and a speculatively executed highest program counter value to represent the speculatively executed program counter range.

6. The apparatus as claimed in claim 5, wherein the fetch circuitry is responsive to the program counter modifying event to initialise the speculatively executed lowest program counter value with the predicted target instruction address.

7. The apparatus as claimed in claim 5, wherein updating the speculatively executed program counter range to include each speculatively executed instruction comprises updating the speculatively executed highest program counter value with a program counter value for each speculatively executed instruction.

8. The apparatus as claimed in claim 1, wherein the program counter speculative range storage element is arranged to store speculatively executed program counter ranges for each unresolved program counter modifying event encountered by the fetch circuitry, and the fetch circuitry is responsive to the program counter modifying event to determine an index to select between multiple entries in the program counter speculative range storage element.

9. The apparatus as claimed in claim 1, wherein the program counter permitted range storage element is arranged further to store restriction information defining one or more restrictions on use of the permitted range of program counter values,
   wherein the program counter permitted range verification circuitry is further responsive to resolution of the program counter modifying event to determine whether the one or more restrictions are satisfied.

10. The apparatus as claimed in claim 1, wherein the program counter modifying event is reception of a branch instruction by the fetch circuitry.

11. The apparatus as claimed in claim 1, wherein the program counter modifying event is reception of a return instruction by the fetch circuitry.

12. The apparatus as claimed in claim 1, wherein the program counter modifying event is an exception entry.

13. The apparatus as claimed in claim 1, wherein the program counter modifying event is an exception return.

14. A method of data processing comprising:
   fetching a sequence of instructions from addresses in memory;
   storing a program counter permitted range indication, wherein the program counter permitted range indication defines a permitted range of program counter values for the sequence of instructions; and
   executing the sequence of instructions, each instruction identified by a program counter value indicative of an address of the instruction, wherein the fetching comprises:
predicting a target instruction addresses for branch instructions;
storing a speculatively executed program counter range,
and in response to a program counter modifying event:
retrieving instructions from a predicted target instruction address and subsequent addresses for speculative execution by the instruction execution circuitry; and
updating the speculatively executed program counter range to include each speculatively executed instruction; and
in response to resolution of a modification of the program counter permitted range indication resulting from the program counter modifying event, determining whether the speculatively executed program counter range satisfies the permitted range of program counter values.

15. Apparatus comprising:
means for fetching a sequence of instructions from addresses in memory;
means for storing a program counter permitted range indication, wherein the program counter permitted range indication defines a permitted range of program counter values for the sequence of instructions;
means for executing the sequence of instructions, each instruction identified by a program counter value indicative of an address of the instruction,
wherein the means for fetching comprises:
means for predicting a target instruction addresses for branch instructions; and
means for storing a speculatively executed program counter range,
and the means for fetching further comprises, responsive to a program counter modifying event:
means for retrieving instructions from a predicted target instruction address and subsequent addresses for speculative execution by the means for executing the sequence of instructions; and
means for updating the speculatively executed program counter range to include each speculatively executed instruction; and
responsive to resolution of a modification of the program counter permitted range indication resulting from the program counter modifying event, means for determining whether the speculatively executed program counter range satisfies the permitted range of program counter values.

* * * * *